United States Patent
Lee et al.

(10) Patent No.: US 8,155,686 B2
(45) Date of Patent: Apr. 10, 2012

(54) APPARATUS AND METHOD FOR SELECTING BANDWIDTH FOR PEER TO PEER COMMUNICATION IN A BROADBAND WIRELESS COMMUNICATION SYSTEM

(75) Inventors: Sang-Min Lee, Seoul (KR); Young-Ho Jung, Suwon-si (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 910 days.

(21) Appl. No.: 12/136,657

(22) Filed: Jun. 10, 2008

(65) Prior Publication Data
US 2009/0005094 A1 Jan. 1, 2009

(30) Foreign Application Priority Data
Jun. 26, 2007 (KR) .................. 10-2007-0062777

(51) Int. Cl.
*H04B 7/00* (2006.01)
*H04B 1/00* (2006.01)
*H04W 4/00* (2009.01)

(52) U.S. Cl. .................. 455/522; 455/69; 455/426.1
(58) Field of Classification Search .............. 455/517, 455/518, 519, 521, 522, 69
See application file for complete search history.

(56) References Cited

U.S. PATENT DOCUMENTS

| | | | |
|---|---|---|---|
| 5,666,649 A | 9/1997 | Dent | |
| 6,415,146 B1 * | 7/2002 | Capece | 455/517 |
| 6,553,010 B1 | 4/2003 | Jober | |
| 7,079,509 B2 * | 7/2006 | Belcea | 370/330 |
| 7,099,296 B2 * | 8/2006 | Belcea | 370/338 |
| 7,167,454 B2 * | 1/2007 | Caldwell et al. | 455/517 |
| 7,239,882 B1 * | 7/2007 | Cook | 455/519 |
| 7,283,832 B2 * | 10/2007 | Jia et al. | 455/517 |
| 7,286,842 B2 * | 10/2007 | Li et al. | 455/502 |
| 7,308,266 B2 * | 12/2007 | Du et al. | 455/445 |
| 7,333,824 B2 * | 2/2008 | Zhang et al. | 455/502 |
| 7,336,638 B2 * | 2/2008 | Cheng et al. | 370/338 |
| 7,539,507 B2 * | 5/2009 | Grob et al. | 455/522 |
| 7,831,252 B2 * | 11/2010 | Shang et al. | 455/436 |
| 7,876,701 B2 * | 1/2011 | Li et al. | 370/252 |
| 8,041,375 B2 * | 10/2011 | Laroia et al. | 455/517 |
| 8,060,105 B2 * | 11/2011 | Jung et al. | 455/452.2 |
| 2004/0077355 A1 * | 4/2004 | Krenik et al. | 455/450 |
| 2008/0069062 A1 * | 3/2008 | Li et al. | 370/338 |

* cited by examiner

Primary Examiner — Tilahun B Gesesse
(74) Attorney, Agent, or Firm — Jefferson IP Law, LLP

(57) ABSTRACT

An apparatus and method for performing Peer-to-Peer (P2P) communication in a broadband wireless communication system are provided. The apparatus includes a first calculator for calculating a maximum Transmit (Tx) power level for each band of a Mobile Station (MS) by using channel information and capability information of the MS; a second calculator for calculating a preference for each band of the MS by using information on the maximum Transmit (Tx) power level for each band and by using interference information for each band of a counterpart MS; and a selector for selecting a P2P transmission band of the MS according to the preference for each band.

36 Claims, 14 Drawing Sheets

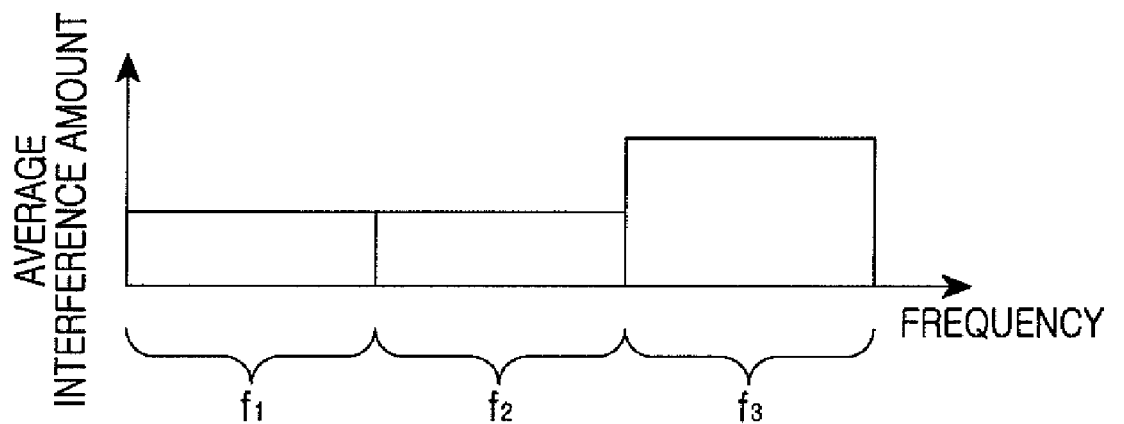
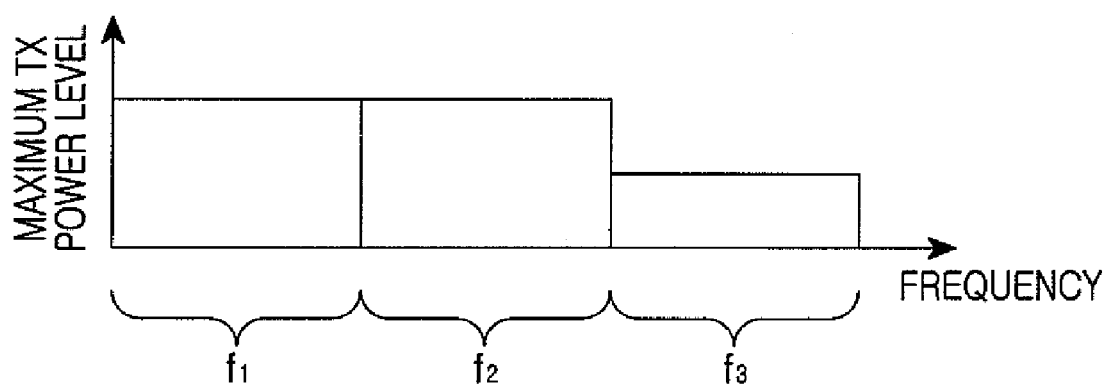
FIG.7A

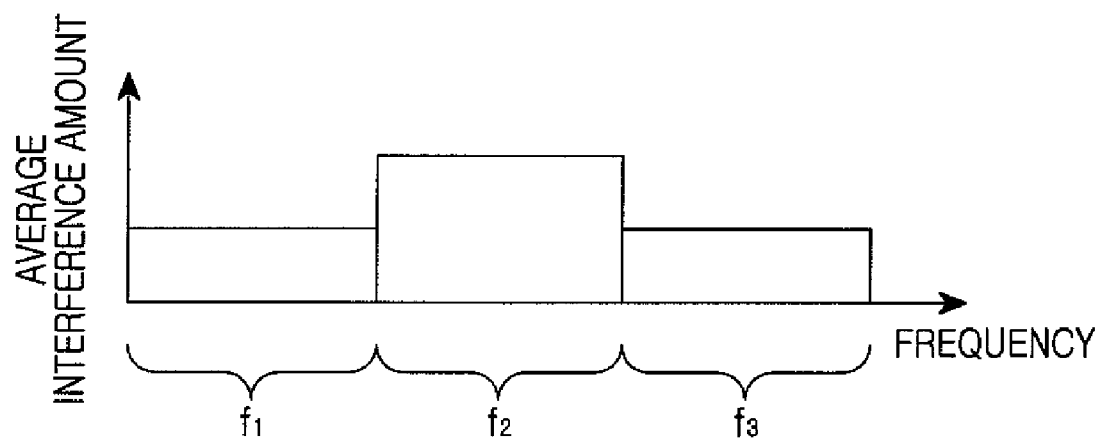
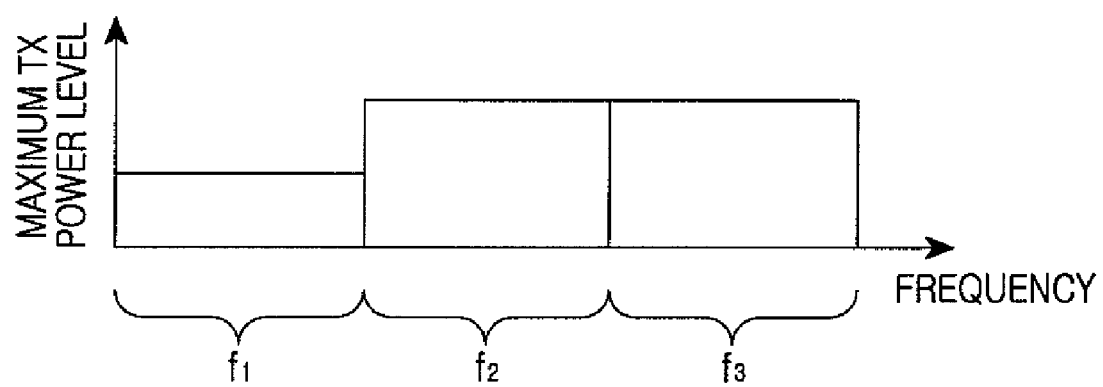
FIG.7B

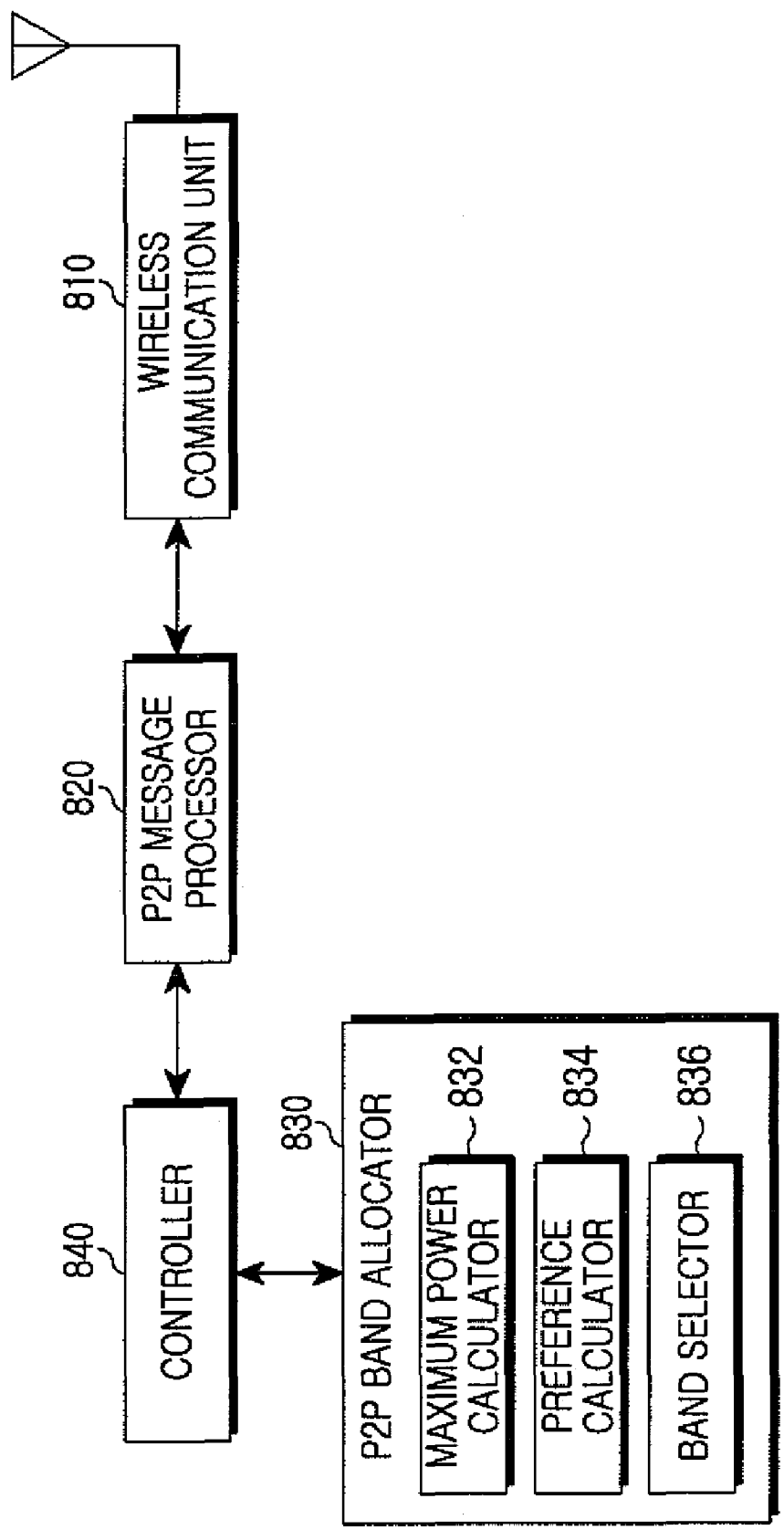

APPARATUS AND METHOD FOR SELECTING BANDWIDTH FOR PEER TO PEER COMMUNICATION IN A BROADBAND WIRELESS COMMUNICATION SYSTEM

PRIORITY

This application claims the benefit under 35 U.S.C. §119(a) to a Korean patent application filed in the Korean Intellectual Property Office on Jun. 26, 2007 and assigned Serial No. 2007-62777, the entire disclosure of which is hereby incorporated by reference.

BACKGROUND OF THE INVENTION

1. Field of the Invention

The present invention relates to a broadband wireless communication system. More particularly, the present invention relates to an apparatus and method for supporting Peer-to-Peer (P2P) communication in a broadband wireless communication system.

2. Description of the Related Art

In a conventional cellular system, a Mobile Station (MS) directly communicates with a Base Station (BS) by using radio resources managed by the BS. In other words, in order for two MSs to communicate with each other, the two MSs establish connections with the BS, and UpLink (UL) and DownLink (DL) radio resources are allocated by the BS. Then, the BS receives data from one of the MSs through one of the connections and transmits the data to the other MS through the other connection.

The two MSs may also communicate with each other in a Peer-to-Peer (P2P) manner. P2P communication is performed through a direct connection between the two MSs. A signal is directly transmitted/received between the two MSs. Examples of a wireless communication system supporting P2P communication include a Wireless world INitiative NEw Radio (WINNER) system of the Wireless World Initiative (WWI).

FIG. 1 illustrates a frame structure of the conventional WINNER system. A frame of the WINNER system is composed of super frames. One super frame includes a control signal region 110, a plurality of DL regions 120, a plurality of UL regions 130, and a P2P region 140. The P2P region 140 is a resource region which is allocated for P2P communication between MSs. Thus, the P2P region 140 is not used for communication between a BS and an MS. Accordingly, the MSs can perform P2P communication without interference from the BS.

However, by additionally allocating the resource region for P2P communication, an amount of resources to be used in traffic transmission/reception is reduced. Accordingly, a method in which a frequency band can be reused in a cellular system without having to allocate additional resources for P2P communication is needed. Specifically, there is a need for a method of searching for a frequency band to be used in a P2P communication without interfering with the cellular system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for performing Peer-to-Peer (P2P) communication in a broadband wireless communication system without interfering with a cellular system.

Another aspect of the present invention is to provide an apparatus and method for allocating a P2P communication band in a broadband wireless communication system.

In accordance with an aspect of the present invention, an apparatus for selecting a P2P communication band in a broadband wireless communication system supporting P2P communication is provided. The apparatus includes a first calculator for calculating a maximum Transmit (Tx) power level for each band of a Mobile Station (MS) by using channel information and capability information of the MS, a second calculator for calculating a preference for each band of the MS by using information on the maximum Tx power level for each band and by using interference information for each band of a counterpart MS, and a selector for selecting a P2P transmission band of the MS according to the preference for each band.

In accordance with another aspect of the present invention, a Base Station (BS) apparatus in a broadband wireless communication system supporting P2P communication is provided. The apparatus includes a processor for determining at least one of interference information for each band, channel information, and capability information, each regarding a first MS, and identifier information regarding a second MS, by using a P2P request message received from the first MS and for determining at least one of interference information for each band, channel information, and capability information, each regarding the second MS, by using a P2P grant message received from the second MS, an allocator for selecting P2P transmission bands of the first MS and the second MS by using information determined according to the P2P request message and the P2P grant message, and a communication unit for transmitting information on the P2P transmission bands of the first MS and the second MS to the first MS and the second MS, respectively.

In accordance with another aspect of the present invention, an MS apparatus in a broadband wireless communication system supporting P2P communication is provided. The apparatus includes a measuring unit for measuring interference information for each band of the MS by using at least one of a downlink signal of a BS, an uplink signal of the MS, and a P2P communication signal of a counterpart MS, each of which are received using P2P communication resources, and for measuring channel information of the MS by using a preset signal, a processor for determining interference information for each band of the counterpart MS by using a message received from the counterpart MS, and an allocator for selecting a P2P transmission band by using the interference information for each band of the counterpart MS, the channel information of the MS, and capability information of the MS.

In accordance with another aspect of the present invention, a method of selecting a P2P communication band in a broadband wireless communication system supporting P2P communication is provided. The method includes calculating a maximum Tx power level for each band of an MS by using channel information and capability information of the MS, calculating a preference for each band of the MS by using information on the maximum Tx power level for each band and by using interference information for each band of a counterpart MS, and selecting a P2P transmission band of the MS according to the preference for each band.

In accordance with another aspect of the present invention, a method of operating a BS in a broadband wireless communication system supporting P2P communication is provided. The method includes determining at least one of interference information for each band, channel information, and capability information, each regarding a first MS, and identifier information regarding a second MS, by using a P2P request message received from the first MS, determining at least one of interference information for each band, channel information, and capability information, each regarding the second MS, by using a P2P grant message received from the second MS, selecting P2P transmission bands of the first MS and the second MS by using information determined according to the P2P request message and the P2P grant message, and transmitting information on the P2P transmission bands of the first MS and the second MS to the first MS and the second MS, respectively.

In accordance with another aspect of the present invention, a method of operating an MS in a broadband wireless communication system supporting P2P communication is provided. The method includes measuring interference information for each band of the MS by using at least one of a downlink signal of a BS, an uplink signal of the MS, and a P2P communication signal of a counterpart MS, each of which are received using P2P communication resources, determining interference information for each band of the counterpart MS by using a message received from the counterpart MS, and selecting a P2P transmission band by using the interference information for each band of the counterpart MS, channel information of the MS, and capability information of the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 7A and 7B illustrate another example of parameters measured to select a P2P band in a broadband wireless communication according to an exemplary embodiment of the present invention;

FIG. 8 is a block diagram of a Base Station (BS) in a broadband wireless communication system according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a technique of the present invention will be described which selects a Peer-to-Peer (P2P) communication band in a broadband wireless communication system.

Figure 1:
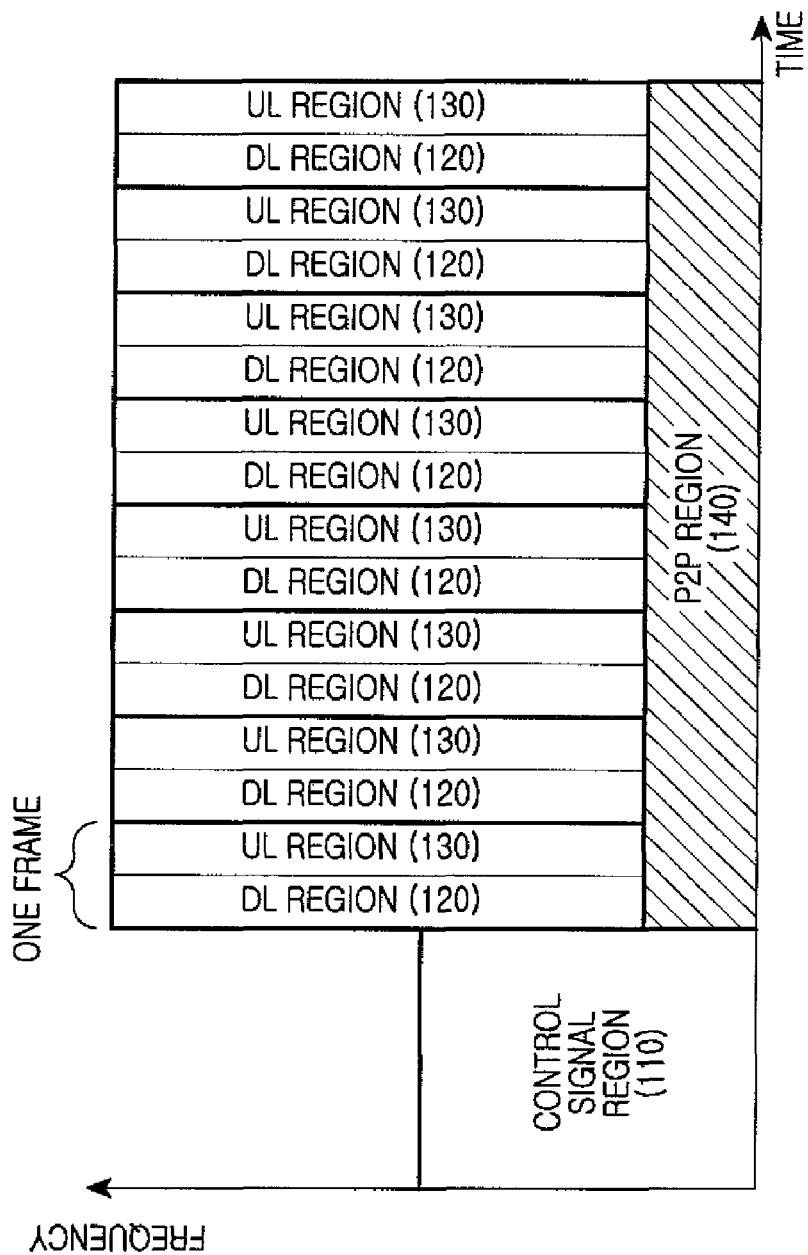
FIG. 1 illustrates a frame structure of a conventional Wireless world INitiative NEw Radio (WINNER) system.
Figure 2A:
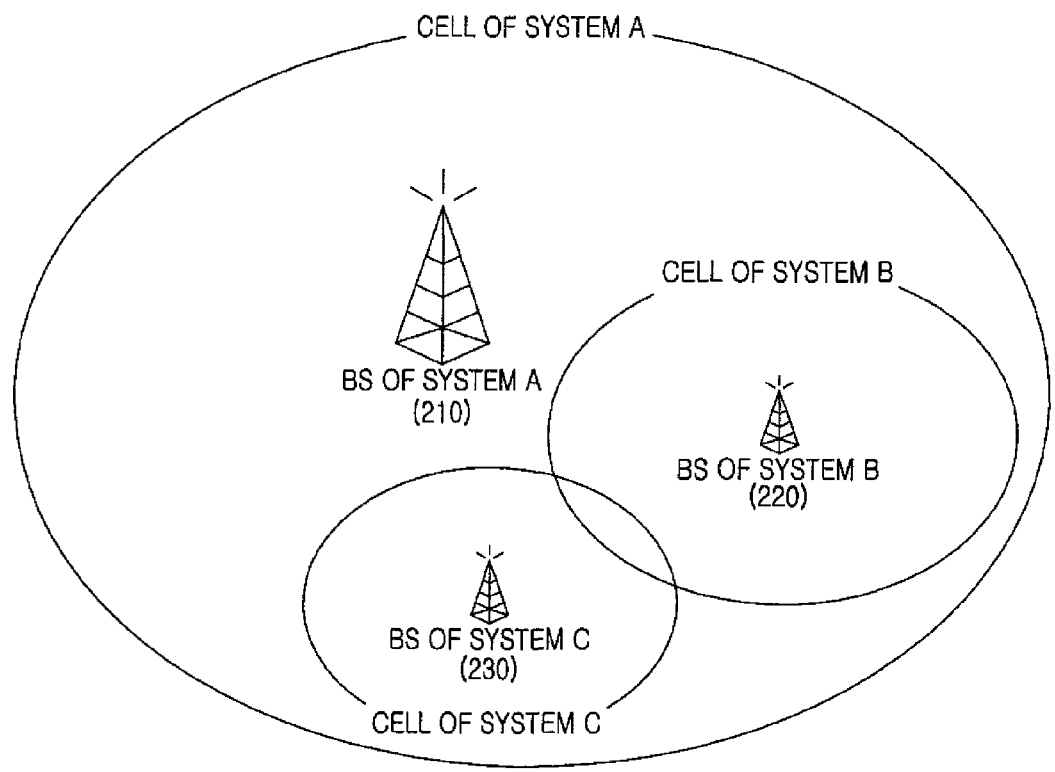
FIGS. 2A and 2B illustrate a communication environment in a broadband wireless communication system according to an exemplary embodiment of the present invention.
Figure 2B:
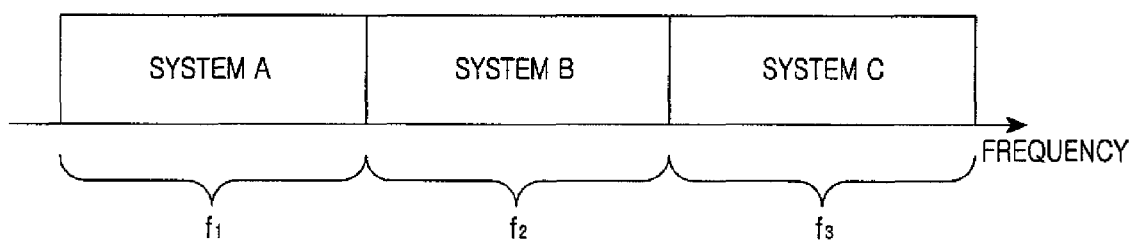

In a communication environment of an exemplary embodiment of the present invention, a plurality of wireless communication systems using different frequency bands exist as illustrated in FIGS. 2A and 2B. Referring to FIG. 2A, a Base Station (BS) 210 of a system A, a BS 220 of a system B, and a BS 230 of a system C belong to different wireless communication systems. Cell coverage areas of the respective BSs overlap with one another. Referring to FIG. 2B, the system A, the system B, and the system C use different frequency bands. A Mobile Station (MS) of an exemplary embodiment of the present invention knows the respective frequency bands of the system A, the system B, and the system C, and can transmit/receive signals by selectively using two or more frequency bands. That is, according to an exemplary embodiment of the present invention, a frequency band of a specific system may be selected for P2P communication.

The present invention proposes a method of selecting a P2P band. The method is performed by considering an amount of interference for each band and a maximum Transmit (Tx) power level for each band.

The amount of interference for each band is a strength of a signal received by using a resource to be used in P2P communication. For example, the interference may be generated by DownLink (DL) signals of a BS, UpLink (UL) signals of neighbor MSs, P2P transmission signals of the neighbor MSs, etc. The interference for each band is measured by an MS. The interference for each band may be obtained by averaging the periodically measured values or by measuring instantaneous values.

The maximum Tx power level for each band is a maximum power level at which signals can be transmitted in P2P communication without interfering with a cellular system. For example, if P2P communication is performed by using UL resources of the cellular system, the maximum Tx power level has to be below a threshold when it is received by a BS of the system. That is, if power received by the BS of the system is below the threshold, the MS can transmit the P2P communication signals without influencing the system. In addition, when P2P communication is performed by using DL resources of the cellular system, the maximum Tx power level has to be below the threshold when it is received within a cell coverage area which uses a corresponding band.

An entity for computing the maximum Tx power level for each band may be the MS or the BS. If the BS computes the maximum Tx power level for each band, the BS receives required information. The information that is required when the maximum Tx power level for each band is computed is channel information of the MS and capability information of the MS. When DL resources are used, cell coverage information for each band is also required. Herein, the channel information includes a distance between the BS and the MS, power required for the MS to receive a preamble from the BS for each band, and an estimated value for a channel between the MS and the BS for each band. The capability information includes a critical Tx power and a transmission bandwidth. Among the aforementioned information, the channel information is measured by the MS and the capability information is determined when the MS is designed.

An exemplary embodiment of the present invention includes two cases according to an entity for selecting a P2P communication band. That is, the P2P communication band is selected by the BS or the MS. When the P2P communication band is selected by the BS, interference can be reduced by using information on a different P2P communication band, and advantageously, the maximum Tx power level of the MS can more accurately be calculated. Further, an initial connection can be established by using the channel between the MS and the BS in a relatively more reliable manner. However, there is a drawback in that the BS consumes radio resources for the establishment of the initial connection for the P2P communication.

Now, a process of selecting a P2P communication band, performed by a BS, will be described according to an exemplary embodiment of the present invention.

Figure 3:
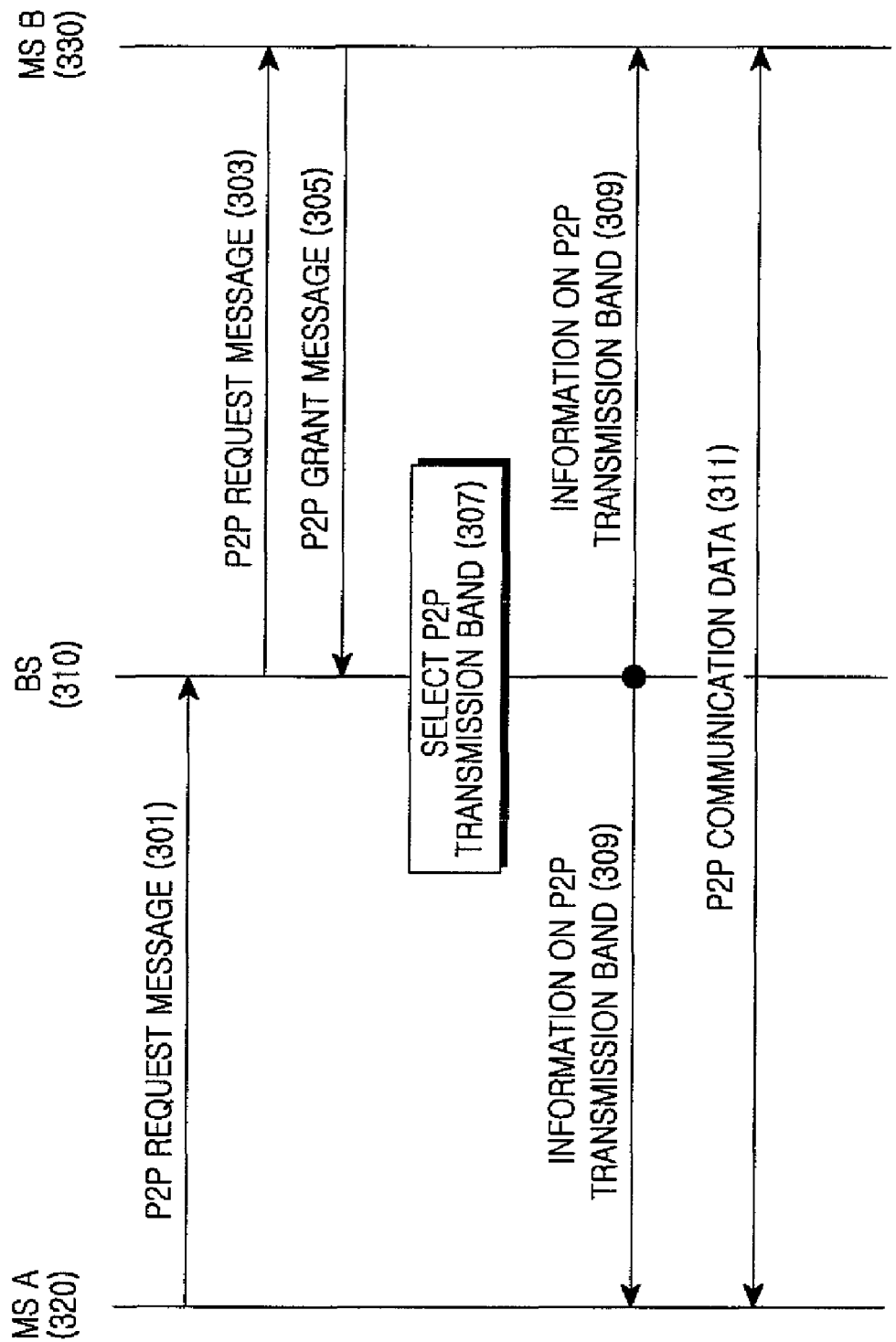
FIG. 3 is a flow diagram illustrating messages exchanged when a Peer-to-Peer (P2P) band is selected in a broadband wireless communication system according to an exemplary embodiment of the present invention.

Referring to FIG. 3, an MS A 320 transmits a P2P request message to a BS 310 in step 301. The P2P request message includes identification information of a counterpart MS (i.e., an MS B 330), interference information of the MS A 320, channel information of the MS A 320, and capability information of the MS A 320.

Upon receiving the P2P request message, the BS 310 calculates a maximum Tx power level of the MS A 320, and transmits the P2P request message to the MS B 330 in step 303. The P2P request message includes identification information of the MS A 320.

Upon receiving the P2P request message, the MS B 330 grants the request of the MS A 320 and transmits a P2P grant message to the BS 310 in step 305. The P2P grant message includes interference information of the MS B 330, channel information between the MS B 330 and the BS 310, and capability information of the MS B 330.

Upon receiving the P2P grant message, the BS 310 calculates a maximum Tx power level of the MS B 330, and selects a P2P transmission band by using interference information and maximum Tx power level information of the MS A 320 and the MS B 330 in step 307.

After selecting the P2P transmission band, the BS 310 transmits information on the selected P2P transmission band to both the MS A 320 and the MS B 330 in step 309. In this case, the BS 310 also transmits information on initial synchronization and connection configuration for P2P communication.

Thereafter, the MS A 320 and the MS B 330 establish P2P connections, and perform P2P communication by exchanging P2P data in step 311.

Now, a process of selecting a P2P communication band, performed by an MS, will be described according to another exemplary embodiment of the present invention.

Figure 4:
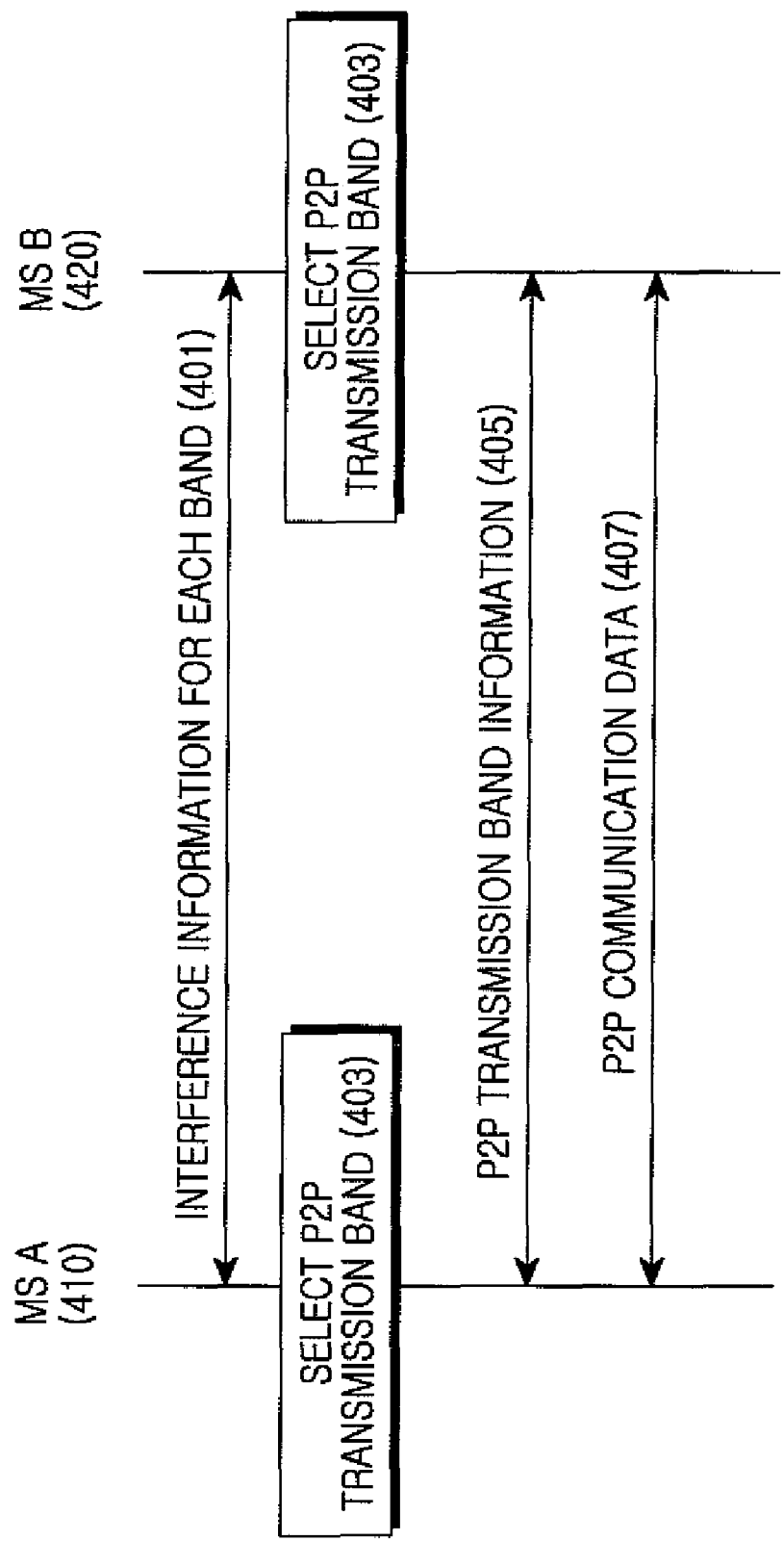
FIG. 4 is a flow diagram illustrating messages exchanged when a P2P band is selected in a broadband wireless communication system according to another exemplary embodiment of the present invention.

Referring to FIG. 4, an MS A 410 and an MS B 420 perform an initial synchronization and establish a connection, and thereafter exchange their information on interference for each band in step 401.

The MS A 410 and the MS B 420 select their P2P transmission bands by using information on interference influencing their counterpart MSs and also by using their maximum Tx power level information in step 403.

The MS A 410 and the MS B 420 exchange their P2P transmission band information in step 405.

Thereafter, the MS A 410 and the MS B 420 perform P2P communication by exchanging P2P data through the selected P2P transmission bands in step 407.

In the exemplary embodiment described with reference to FIG. 4, each MS selects its P2P transmission band and then performs P2P communication. When two MSs select their P2P transmission bands, the two MSs may select the same band. To prevent this, one of the two MSs may first select a P2P transmission band of a counterpart MS and then select the remaining band as a P2P transmission band of the MS. The MS that first selects its P2P transmission band prior to the counterpart MS may either be an MS that requests P2P communication or an MS that grants P2P communication.

In another exemplary embodiment similar to the exemplary embodiment of FIG. 4, one MS may select P2P transmission bands of two MSs. In this case, one MS acquires interference information and maximum Tx power level information from a counterpart MS, selects a P2P transmission band of the MS and a P2P transmission band of the counterpart MS, and informs the result of the selection to the counterpart MS. Thereafter, the two MSs perform P2P communication by using their P2P transmission bands.

According to the aforementioned exemplary procedure, a BS or an MS selects a P2P band. In this case, the selection on the P2P band is accomplished as follows.

To facilitate the following explanation, it will be assumed hereinafter that an MS A and an MS B are two MSs which intend to perform P2P communication. $I\_A1, I\_A2, \ldots, I\_AN$ denote amounts of interference for each band that influence the MS A. $P\_A1, P\_A2, \ldots, P\_AN$ denote maximum Tx power levels for each band of the MS A. $I\_B1, I\_B2, \ldots, I\_BN$ denote amounts of interference for each band that influence the MS B. $P\_B1, P\_B2, \ldots, P\_BN$ denote maximum Tx power levels for each band of the MS B. In addition, $f(I, P)$ is a preference of a P2P transmission band of a transmitting MS.

The preference of the P2P transmission band is selected according to the maximum Tx power level of the transmitting MS and the amount of interference influencing a receiving MS. That is, the greater the maximum Tx power level of the transmitting MS, the higher the preference. The smaller the amount of inference influencing the transmitting MS, the higher the preference. For example, when the MS A performs transmission, the preference of the MS A for an $n^{th}$ band is expressed by $f(I\_Bn, P\_An)$. The preference is inversely proportional to $I\_Bn$ and is proportional to $P\_An$.

Figure 5A:
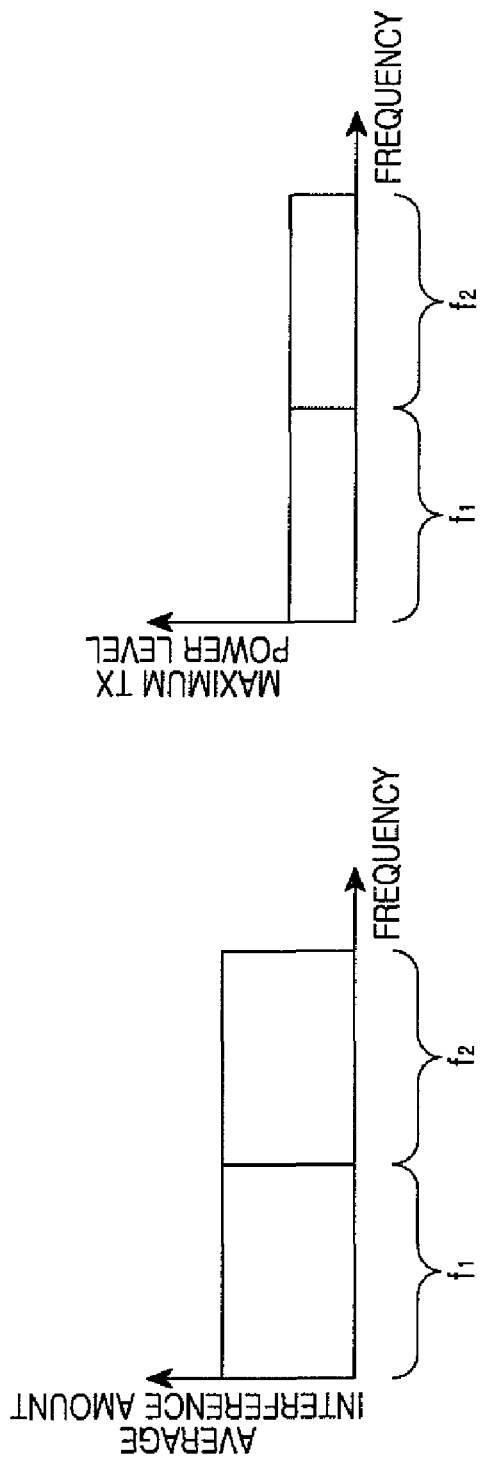
FIGS. 5A and 5B illustrate an example of parameters measured to select a P2P band in a broadband wireless communication according to an exemplary embodiment of the present invention.
Figure 5B:
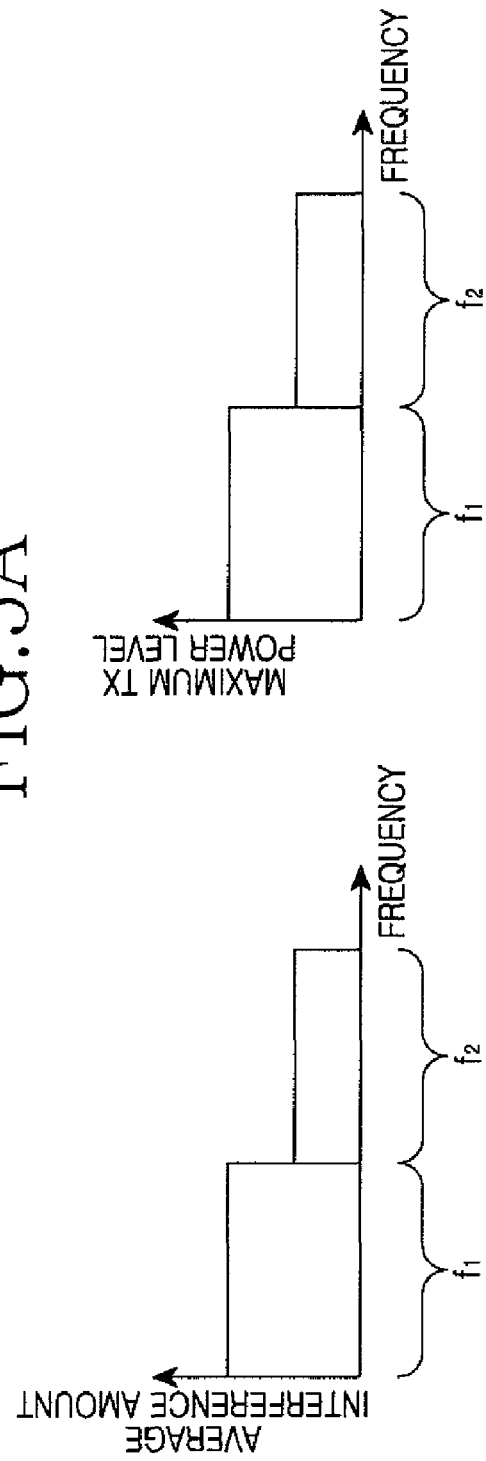
Figure 6A:
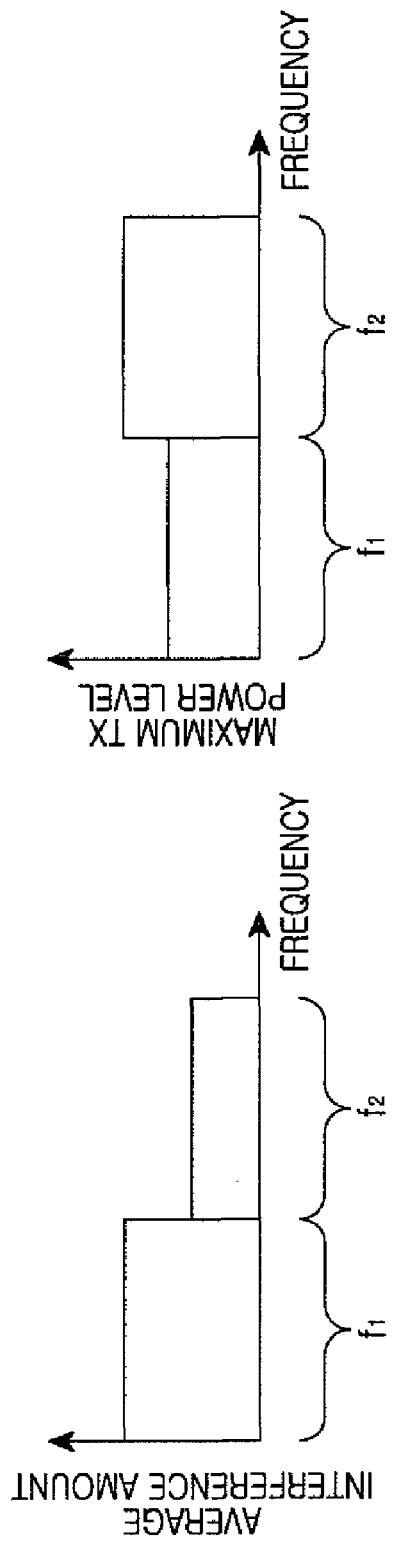
FIGS. 6A and 6B illustrate another example of parameters measured to select a P2P band in a broadband wireless communication according to an exemplary embodiment of the present invention.
Figure 6B:
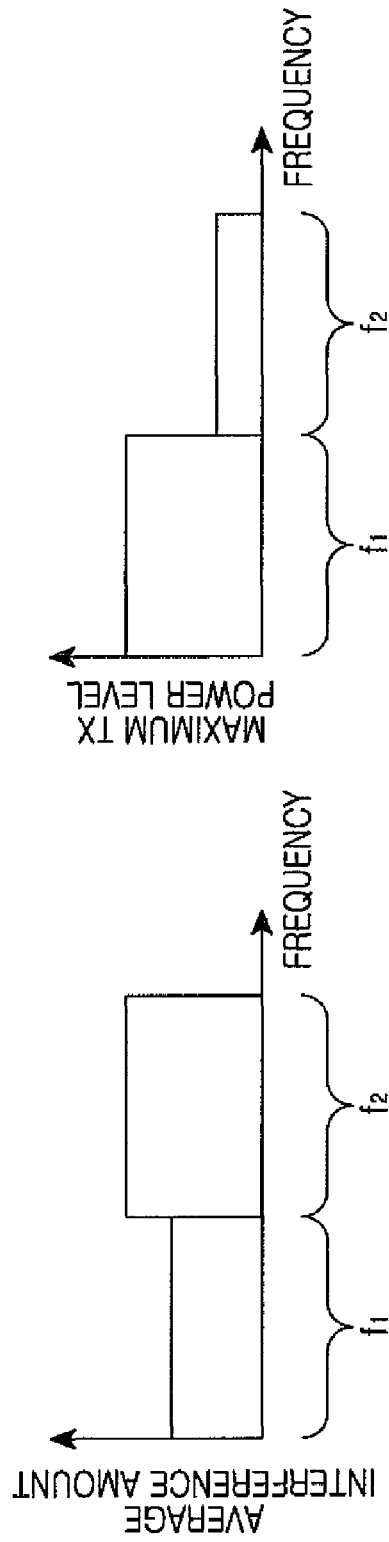

For example, assume that parameters of the MS A are measured as illustrated in FIG. 5A, and parameters of the MS B are measured as illustrated in FIG. 5B. In this case, it is preferable that a P2P transmission band of the MS A is f2 and a P2P transmission band of the MS B is f1. For another example, assume that parameters of the MS A are measured as illustrated in FIG. 6A, and parameters of the MS B are measured as illustrated in FIG. 6B. In this case, when f1 and f2 are compared from a viewpoint of the MS A, P_A2 is large at f2 and I_B2 is also large at f2, whereas I_B1 is small at f1 and P_A1 is also small at f1. In the case of FIGS. 6A and 6B, a preference function f(I, P) needs to be properly determined in order to select a desired P2P band. For another example, parameters of the MS A are measured as illustrated in FIG. 7A, and parameters of the MS B are measured as illustrated in FIG. 7B. In this case, it is preferable that a P2P transmission band of the MS A is f1, and a P2P transmission band of the MS B is f2.

A simplest form of the function f(I, P) can be expressed by Equation (1) below.

$$f(I, P) = \frac{P}{I} \quad (1)$$

In Equation (1), P denotes a maximum power level of the transmitting MS, and I denotes an amount of interference influencing the receiving MS.

For another example, the function f(I, P) can be expressed by Equation (2) below.

$$f(I, P) = \begin{cases} \frac{1}{I}, & \frac{P}{I} > T \\ 0, & \frac{P}{I} \leq T \end{cases} \quad (2)$$

In Equation (2), P denotes a maximum power level of the transmitting MS, I denotes an amount of interference influencing the receiving MS, and T denotes a threshold of a P2P Signal-to-Noise plus Interference Ratio (SNIR) at which P2P communication is possible. When the function f(I, P) of Equation (2) is used, a band which corresponds to the P2P SNIR below the threshold is not used.

Hereinafter, structures and operations of a BS and an MS which select a P2P band according to the aforementioned technique will be described in detail with reference to the accompanying drawings.

FIG. 8 is a block diagram of a BS in a broadband wireless communication system according to an exemplary embodiment of the present invention.

Referring to FIG. 8, the BS includes a wireless communication unit 810, a P2P message processor 820, a P2P band allocator 830, and a controller 840.

The wireless communication unit 810 performs a mutual-conversion function between a bit-stream and a signal transmitted to and received from an MS through an antenna. For example, when using an Orthogonal Frequency Division Multiplexing (OFDM)-based wireless communication system, the wireless communication unit 810 transmits signals in the following manner. The wireless communication unit 810 converts the provided bit-steam into complex symbols by performing decoding and modulation. Then, the wireless communication unit 810 generates a baseband OFDM symbol by performing an Inverse Fast Fourier Transform (IFFT) on the complex symbols arranged in a frequency axis. Further, the wireless communication unit 810 converts the baseband OFDM symbol into a Radio Frequency (RF) signal and transmits the RF signal through an antenna.

The P2P message processor 820 generates and analyzes a control message for P2P communication between MSs. The P2P message processor 820 analyzes a P2P control message received from a first MS and generates another P2P control message to be transmitted to the first MS. For example, the P2P control message received from the first MS may be a P2P request message or a P2P grant message, and the P2P control message to be transmitted to the first MS may be a message for informing each MS of a P2P communication band.

The P2P request message includes identification information of a counterpart MS (i.e., a second MS), information on interference influencing the first MS which has transmitted the message, channel information of the first MS, and capability information of the first MS. The P2P grant message includes information on interference influencing the first MS, channel information of the first MS, and capability information of the first MS. The message for informing of the P2P communication band includes P2P transmission band information of each MS, wherein the P2P transmission band is selected by the P2P band allocator 830. Further, the P2P message processor 820 generates a control message for P2P synchronization and an establishment of an initial connection.

The P2P band allocator 830 allocates a P2P transmission band of each MS by using the channel information of each MS, capability information of each MS, and information on interference for each band of each MS. A maximum power calculator 832 calculates a maximum Tx power level for each band by using the channel information and the capability information. If P2P communication supports DL resources, the maximum power calculator 832 calculates the maximum Tx power level for each band by using cell coverage information for each cell in addition to the channel information and the capability information. A preference calculator 834 calculates a preference for each band by using the maximum Tx power level for each band and the interference for each band. For example, the preference calculator 834 calculates the preference for each band as expressed by at least one of Equation (1) and Equation (2) above. A band selector 836 selects a band having a highest preference as a P2P transmission band of each MS.

The controller 840 controls the P2P message processor 820 and the P2P band allocator 830 for P2P communication between the MSs, and provides the required information. Specifically, the controller 840 provides the P2P band allocator 830 with information (i.e., the maximum Tx power level information for each band and the interference information for each band) of each MS so that the P2P band allocator 830 can select the P2P transmission band of each MS. Further, the controller 840 provides the P2P message processor 820 with the P2P transmission band information so that the P2P message processor 820 can generate a message for informing of the P2P transmission band.

Figure 9:
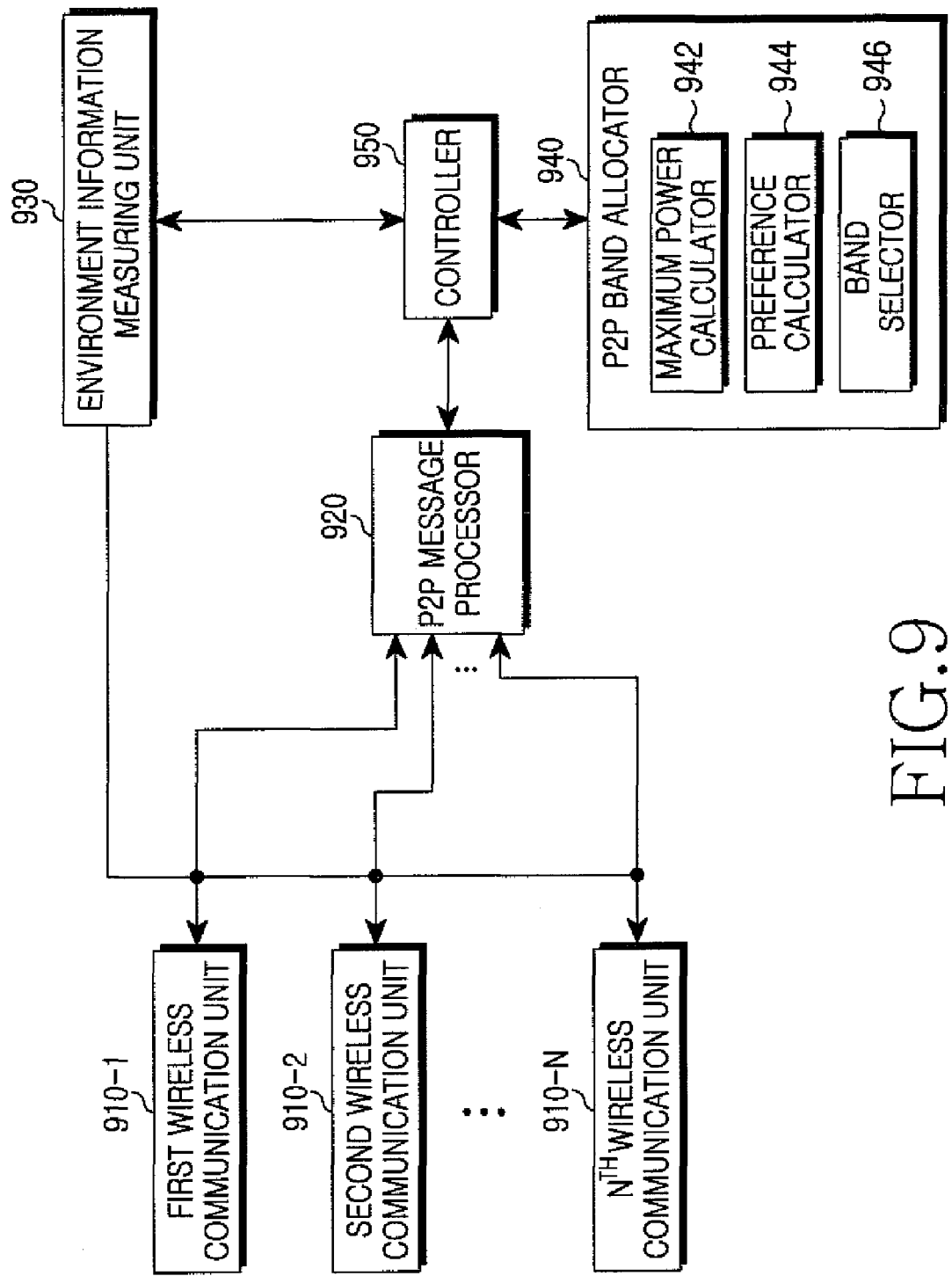
FIG. 9 is a block diagram of a Mobile Station (MS) in a broadband wireless communication system according to an exemplary embodiment of the present invention.

FIG. 9 is a block diagram of an MS in a broadband wireless communication system according to an exemplary embodiment of the present invention.

Referring to FIG. 9, the MS includes a plurality of wireless communication units 910-1 to 910-N, a P2P message processor 920, an environment information measuring unit 930, a P2P band allocator 940, and a controller 950.

Each of the plurality of wireless communication units 910-1 to 910-N performs a mutual-conversion function between a signal and a bit-stream of different bands. The plurality of wireless communication units 910-1 to 910-N correspond to systems using different bands. Although each of the plurality of wireless communication units 910-1 to 910-N has a different processing band, a signal processing method may be equal to or different from one other. For example, if the first wireless communication unit 910-1 is an OFDM-based wireless communication system, the first wireless communication unit 910-1 transmits signals in the following manner. The first wireless communication unit 910-1 converts the provided bit-steam into complexs symbol by performing decoding and modulation. Then, the wireless communication unit 810 generates a baseband OFDM symbol by performing an IFFT on the complex symbols arranged in a frequency axis. Further, the first wireless communication unit 910-1 converts the baseband OFDM symbol into an RF signal and transmits the RF signal through an antenna.

The P2P message processor 920 generates and analyzes a control message for P2P communication. The generated and analyzed control message may vary depending on the exemplary embodiment of the present invention. According to a first exemplary embodiment, the P2P message processor 920 generates a P2P request message and a P2P grant message which are transmitted to a BS, and analyzes a message for informing a P2P communication band received from the BS. The P2P request message includes identification information of a counterpart MS, interference information of the MS of FIG. 9, channel information of the MS, and capability information of the MS. The P2P grant message includes interference information of the MS, channel information of the MS, and capability information of the MS. The message for informing of the P2P communication band includes a message for exchanging interference information with the counterpart MS and a message for exchanging P2P transmission band information. According to a second exemplary embodiment of the present invention, the P2P message processor 920 generates and analyzes the message for exchanging interference information with the counterpart MS and the message for exchanging P2P transmission band information. Further, the P2P message processor 920 generates and analyzes a control message for P2P synchronization and an establishment of a connection.

The environment information measuring unit 930 measures information of the MS that is required to select a P2P transmission band. Thus, the environment information measuring unit 930 estimates a channel between the MS and the BS for each band by using a preset Rx signal (e.g., a pilot signal), and measures an Rx power level of a preamble received from the BS for each band. Further, the environment information measuring unit 930 measures a strength of a signal received via the plurality of wireless communication units 910-1 to 910-N, thereby obtaining an amount of interference for each band.

The P2P band allocator 940 allocates a P2P transmission band of the MS by using the channel information of the MS, capability information of the MS, and interference information for each band of the counterpart MS. A maximum power calculator 942 calculates a maximum Tx power level for each band by using the channel information and the capability information. If P2P communication supports DL resources, the maximum power calculator 942 calculates the maximum Tx power level for each band by using cell coverage information for each band in addition to the channel information and the capability information. A preference calculator 944 calculates a preference for each band by using the maximum Tx power level for each band and the interference for each band. For example, the preference calculator 944 calculates the preference for each band as expressed by at least one of Equation (1) and Equation (2) above. A band selector 946 selects a band having a highest preference as a P2P transmission band of the MS.

However, optionally, the P2P band allocator 940 can allocate not only the P2P transmission band of the MS but also a P2P transmission band of the counterpart MS. According to the first exemplary embodiment, the P2P band allocator 940 may not be included in the MS.

The controller 950 controls the P2P message processor 920, the environment information measuring unit 930, and the P2P band allocator 940 for P2P communication, and provides the required information. The operation of the controller 950 varies depending on the exemplary embodiment of the present invention.

According to a first exemplary embodiment, the controller 950 operates differently in the following two cases, i.e., a case where P2P communication is requested and a case where P2P communication is granted. When P2P communication is requested according to the first exemplary embodiment, in order to start P2P communication, the controller 950 provides the P2P message processor 920 with identification information of the counterpart MS, interference information of the MS, channel information of the MS, and capability information of the MS, so that the P2P message processor 920 can generate a P2P request message. When P2P communication is granted according to the first exemplary embodiment, the controller 950 refers to information included in the P2P request message received from the BS and thus determines whether P2P communication can be granted. Further, the controller 950 provides the P2P message processor 920 with the interference information of the MS, the channel information of the MS, and the capability information of the MS, so that the P2P message processor 920 can generate a P2P grant message. In the both cases, the controller 950 provides control so that P2P communication is performed according to the P2P communication band information received from the BS.

According to a second exemplary embodiment, the controller 950 provides the P2P message processor 920 with interference information of the MS and thus provides control so that the P2P message processor 920 can generate a message for exchanging interference information for each band with the counterpart MS. Further, the controller 950 provides the P2P band allocator 940 with information on interference influencing the counterpart MS and channel information of the MS, and thus provides control so that the P2P band allocator 940 allocates the P2P transmission band of the MS. Furthermore, the controller 950 provides the P2P message processor 920 with the P2P transmission band information and thus provides control so that the P2P message processor 920 generates a message for exchanging the P2P transmission band information. Finally, the controller 950 provides control so that P2P communication is achieved by using the P2P transmission bands of the MS and the counterpart MS.

Figure 10:
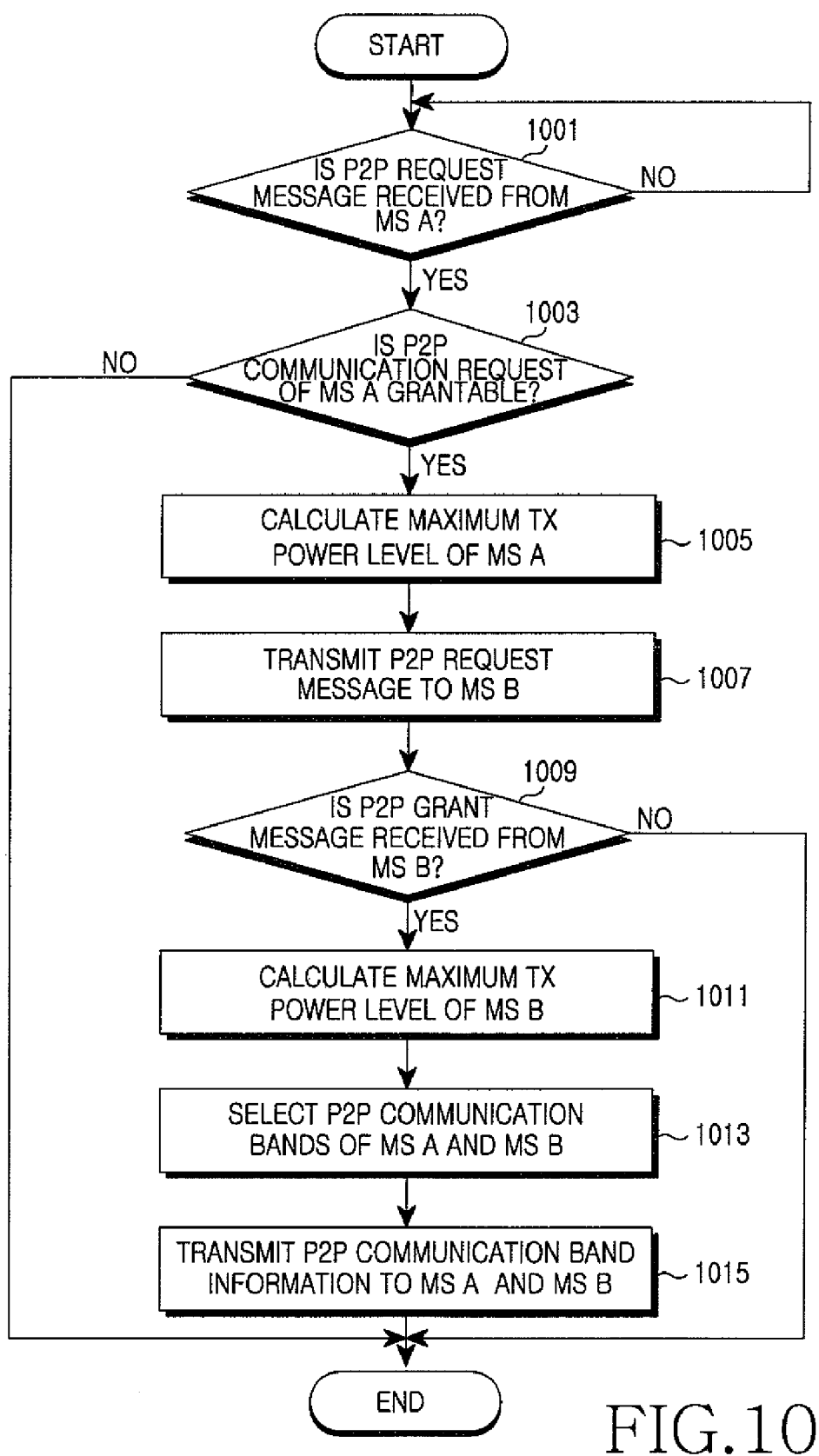
FIG. 10 is a flowchart illustrating an operation of a BS in a broadband wireless communication system according to an exemplary embodiment of the present invention.

FIG. 10 is a flowchart illustrating an operation of a BS in a broadband wireless communication system according to an exemplary embodiment of the present invention. Referring to FIG. 10, an MS A requests P2P communication, and an MS B grants P2P communication.

Referring to FIG. 10, the BS determines if a P2P request message is received from the MS A in step 1001. The P2P request message is for requesting the start of P2P communication and includes identification information of a counterpart MS (i.e., the MS B), interference information of the MS A, channel information of the MS A, and capability information of the MS A.

Upon receiving the P2P request message, the BS determines if the P2P communication request of the MS A can be granted in step 1003. If the P2P communication request of the MS A is grantable, the BS calculates a maximum Tx power level for each band of the MS A in step 1005. When calculating the maximum Tx power level for each band of the MS A, the BS uses the channel information of the MS A and the capability information of the MS A.

After calculating the maximum Tx power level for each band of the MS A, the BS transmits the P2P request message to the MS B in step 1007.

In step 1009, the BS determines if a P2P grant message is received from the MS B. The P2P grant message is for granting the P2P communication request and includes interference information of the MS B, channel information of the MS B, and capability information of the MS B.

Upon receiving the P2P grant message, the BS calculates a maximum Tx power level for each band of the MS B in step 1011. When calculating the maximum Tx power level for each band of the MS B, the BS uses the interference information of the MS B, the channel information of the MS B, and the capability information of the MS B.

In step 1013, the BS selects P2P transmission bands of the MS A and the MS B by using the maximum Tx power level information for each band of each MS and also by using the interference information for each band of each MS. In other words, the BS calculates a preference for each band of the MS A and the MS B, and selects a band having a highest preference as a P2P transmission band of each MS. The preference can be calculated by using at least one of Equation (1) and Equation (2) above.

After determining the P2P transmission band, the BS transmits P2P communication band information to the MS A and the MS B in step 1015.

Figure 11:
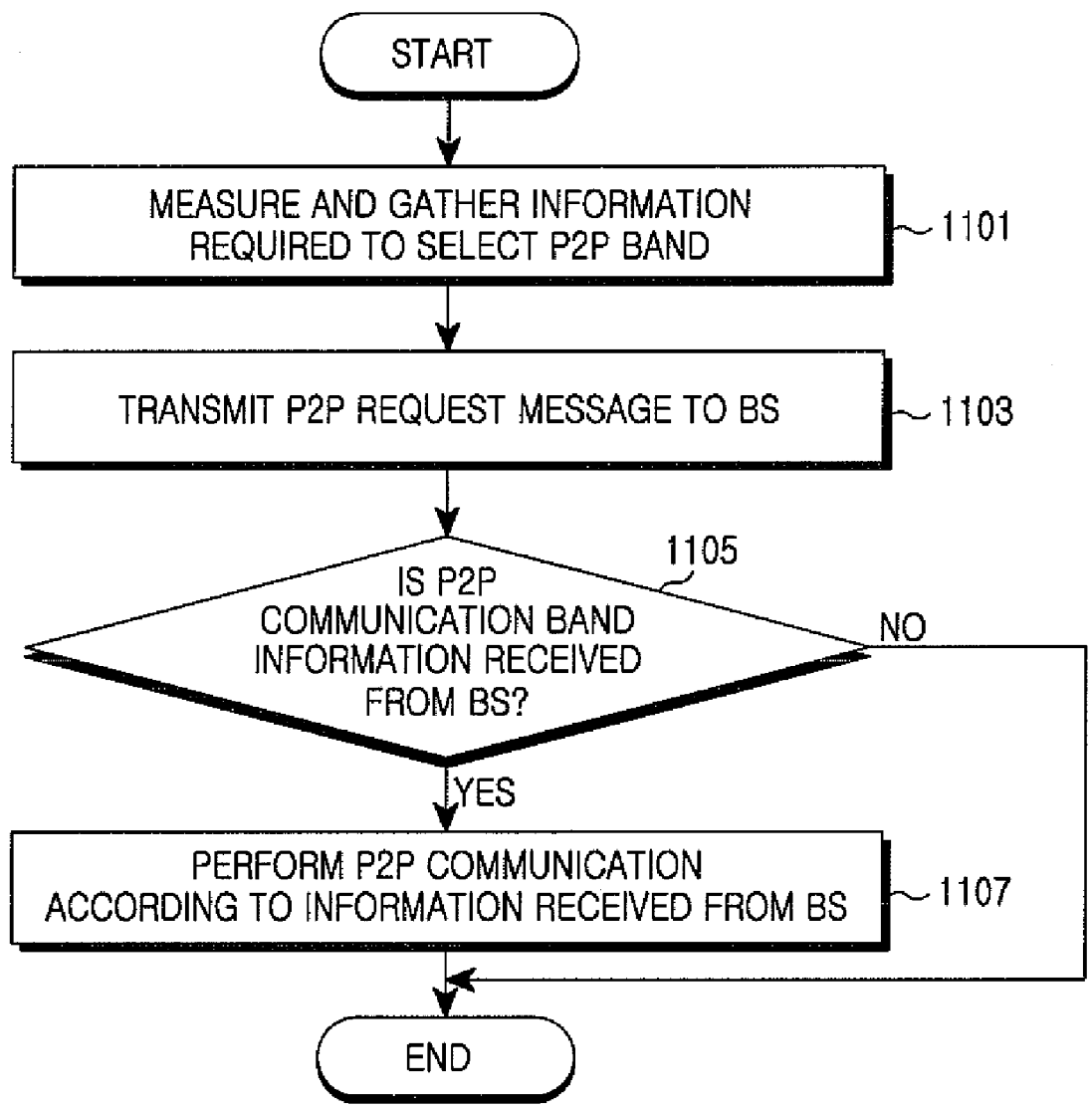
FIG. 11 is a flowchart illustrating an operation of an MS that requests P2P communication in a broadband wireless communication system according to an exemplary embodiment of the present invention.

FIG. 11 is a flowchart illustrating an operation of an MS that requests P2P communication in a broadband wireless communication system according to an exemplary embodiment of the present invention.

Referring to FIG. 11, the MS measures and gathers information required to select a P2P band in step 1101. Examples of the information of the MS that is required to select the P2P transmission band are channel information, capability information, and interference information for each band. The MS estimates a channel between the MS and a BS for each band by using a preset Rx signal (e.g., a pilot signal), and measures an Rx power level of a preamble received from the BS for each band. In addition, the MS measures an amount of interference for each band by measuring a strength of a signal received through each band.

In step 1103, the MS transmits a P2P request message to the BS. The P2P request message is for requesting the start of P2P communication, and includes information gathered and measured in step 1101 and identification information of a counterpart MS.

In step 1105, the MS determines if P2P communication band information is received from the BS. In other words, the MS determines if P2P transmission band information of the MS and P2P transmission band information of the counterpart MS are received from the BS.

Upon receiving the P2P transmission/reception information, the MS performs P2P communication with the counterpart MS according to the P2P communication band information received from the BS in step 1107. That is, the MS performs an initial synchronization and establishes a connection with respect to the counterpart MS, and then exchanges P2P data.

Figure 12:
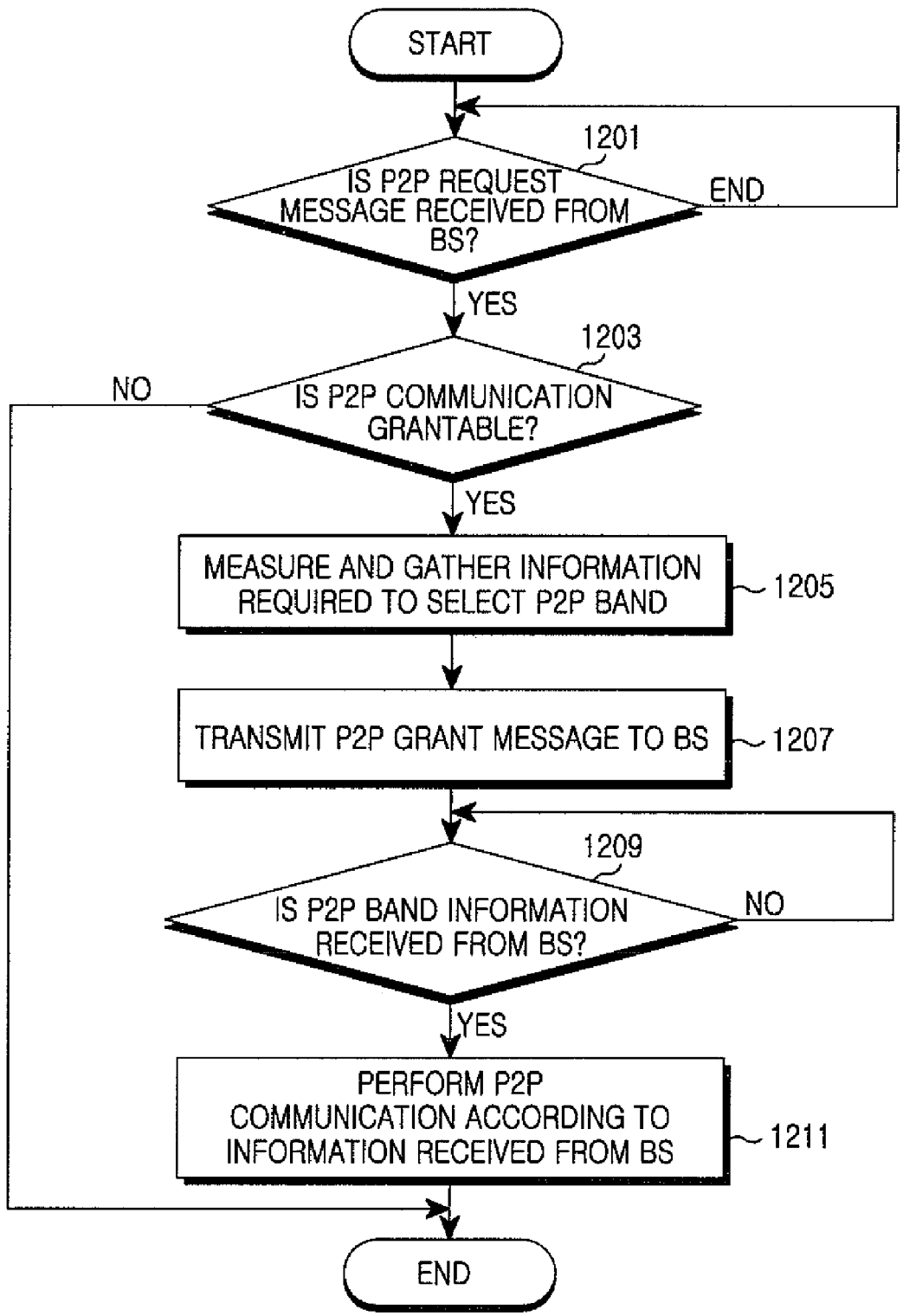
FIG. 12 is a flowchart illustrating an operation of an MS that grants P2P communication in a broadband wireless communication system according to an exemplary embodiment of the present invention.

FIG. 12 is a flowchart illustrating an operation of an MS that grants P2P communication in a broadband wireless communication system according to an exemplary embodiment of the present invention.

Referring to FIG. 12, the MS determines if a P2P request message is received from a BS in step 1201. The P2P request message includes identification information of a counterpart MS that requests P2P communication.

Upon receiving the P2P request message, the MS determines if the P2P communication request can be granted in step 1203. For example, a determination on whether the request may be granted is carried out by a user or by an operation currently performed by the MS.

If the P2P communication request is grantable, the MS measures and gathers information required to select a P2P band in step 1205. Examples of the information required to select the P2P transmission band are information on a channel between the MS and the BS, interference information for each band, capability information, etc. The MS measures interference for each band by measuring a strength of a signal received for each band, and estimates the channel between the MS and the BS by using a preset Rx signal (e.g., a pilot signal).

In step 1207, the MS transmits a P2P grant message to the BS. The P2P grant message is for granting the P2P communication request and includes the information measured and gathered in step 1205.

In step 1209, the MS determines if P2P communication band information is received from the BS. In other words, the MS determines if P2P transmission band information of the MS and P2P transmission band information of the counterpart MS are received from the BS.

Upon receiving the P2P communication band information, the MS performs P2P communication with the counterpart MS according to the P2P communication band information received from the BS in step 1211. That is, the MS performs initial synchronization and establishes a connection with respect to the counterpart MS, and then exchanges P2P data.

Figure 13:
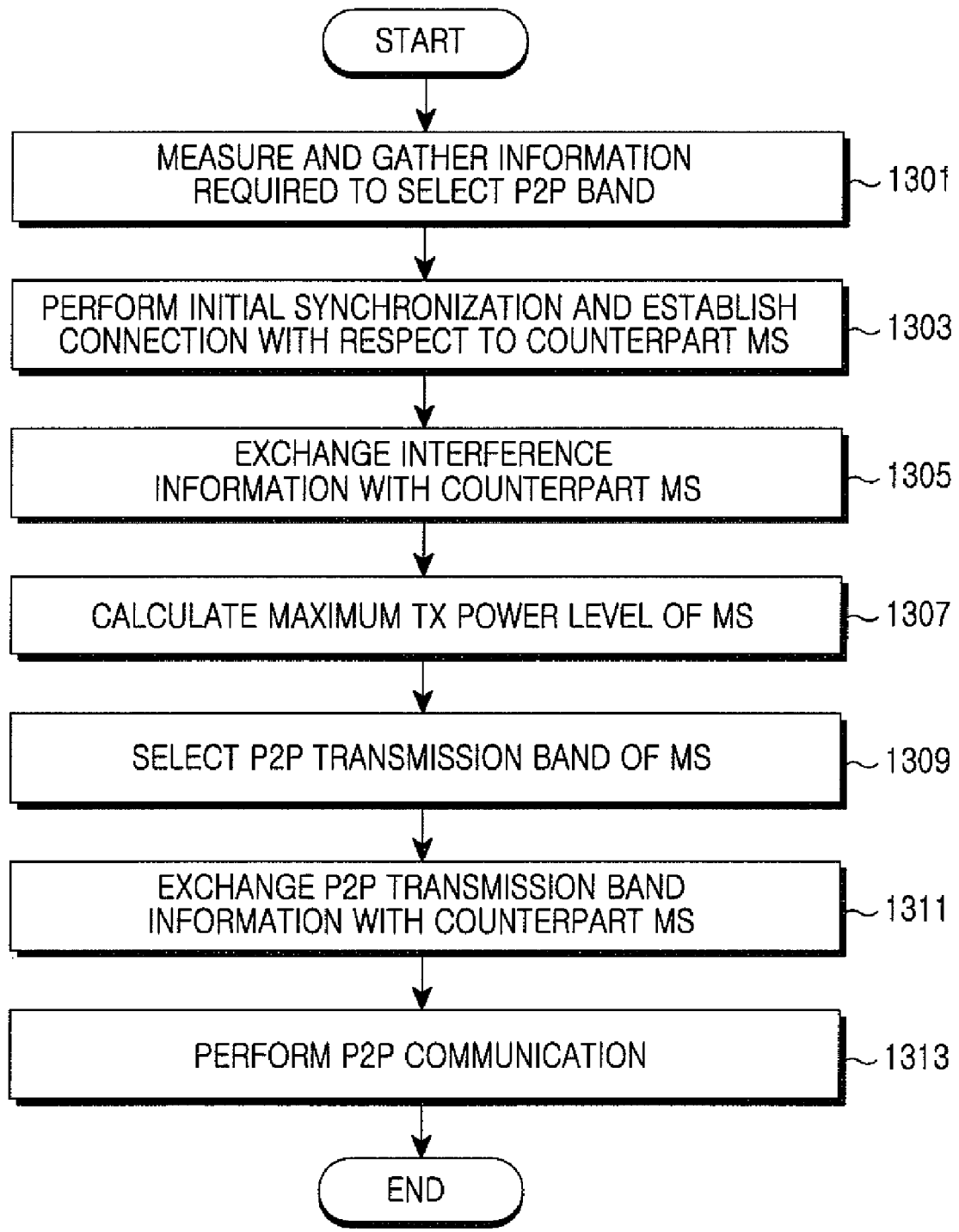
FIG. 13 is a flowchart illustrating an operation of an MS in a broadband wireless communication system according to another exemplary embodiment of the present invention.

FIG. 13 is a flowchart illustrating an operation of an MS in a broadband wireless communication system according to another exemplary embodiment of the present invention.

Referring to FIG. 13, the MS measures interference for each band and a maximum Tx power level for each band of the MS in step 1301. In this case, the MS measures the interference for each band by measuring a strength of a signal received for each band. Further, the MS calculates the maximum Tx power level for each band by using the interference information, information on a channel between the MS and the BS, and capability information of the MS.

In step 1303, the MS performs initial synchronization and establishes a connection with respect to a counterpart MS. That is, the MS prepares to transmit and receive a P2P control message.

In step 1305, the MS and the counterpart MS exchange interference information for each band. That is, the MS acquires interference information for each band of the counterpart MS.

In step 1307, the MS calculates a maximum Tx power level for each band by using the channel information and capability information of the MS.

In step 1309, the MS calculates a preference for each band of the MS by using the interference information for each band of the counterpart MS and the maximum Tx power level for each band of the MS. For example, the MS calculates the preference for each band of the MS according to at least one of Equation (1) and Equation (2) above.

In step 1311, the MS and the counterpart MS exchange their P2P transmission band information. Thus, the MS acquires P2P transmission band information of the counterpart MS.

In step 1313, the MS performs P2P communication with the counterpart MS.

In the procedure described with reference to FIG. 13, according to an exemplary embodiment of the present invention, an MS selects a P2P transmission band of the MS and thus performs P2P communication. When two MSs select their P2P transmission bands, in some cases, the two MSs may select the same band as their P2P transmission bands. To prevent this, one of the two MSs may determine a P2P transmission band of a counterpart MS and select the remaining band as a P2P transmission band of the MS. The MS that first selects its P2P transmission band prior to the counterpart MS may be either an MS that requests P2P communication or an MS that grants P2P communication.

According to another exemplary embodiment of the present invention, one MS may select two P2P transmission bands of two MSs. In this case, either an MS that requests P2P communication or an MS that grants P2P communication selects P2P transmission bands of both the MS and its counterpart MS by acquiring inference information influencing the counterpart MS and maximum Tx power level information. The MS that selects the P2P transmission band may calculate the maximum Tx power level information of the counterpart MS by acquiring channel information and capability information of the counterpart MS.

According to an exemplary embodiment of the present invention, in a broadband wireless communication system, a P2P transmission band is selected by using an amount of interference for each band and a maximum Tx power level for each band of each MS for P2P communication. Therefore, P2P communication can be achieved by selecting a most suitable band for P2P communication among available bands without interfering with a cellular system.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the invention.

What is claimed is:

1. An apparatus for selecting a Peer-to-Peer (P2P) communication band in a wireless communication system supporting P2P communication, the apparatus comprising:
    a first calculator for calculating a maximum Transmit (Tx) power level for each band of a Mobile Station (MS) by using channel information and capability information of the MS;
    a second calculator for calculating a preference for each band of the MS by using information on the maximum Tx power level for each band and by using interference information for each band of a counterpart MS; and
    a selector for selecting a P2P transmission band of the MS according to the preference for each band.

2. The apparatus of claim 1, wherein the channel information of the MS comprises at least one of a distance between the MS and a Base Station (BS) for each band, power required for the MS to receive a preamble from the BS for each band, and an estimated value for a channel between the MS and the BS for each band.

3. The apparatus of claim 1, wherein the capability information of the MS comprises at least one of a critical Tx power of the MS and a transmission bandwidth of the MS.

4. The apparatus of claim 1, wherein the first calculator calculates the maximum Tx power level for each band so that a Tx signal of the MS can be received with a power level below a threshold by the BS which uses the same band as the Tx signal.

5. The apparatus of claim 1, wherein the first calculator calculates the maximum Tx power level for each band so that a Tx signal of the MS can be received with a power level below a threshold within a cell coverage area in which the same band as the Tx signal is used.

6. The apparatus of claim 1, wherein the preference for each band is one of proportional to a maximum power level of a transmitting MS and inversely proportional to an amount of interference influencing a receiving MS.

7. A Base Station (BS) apparatus in a wireless communication system supporting Peer-to-Peer (P2P) communication, the apparatus comprising:
    a processor for determining at least one of interference information for each band, channel information, and capability information, each regarding a first Mobile Station (MS), and identifier information regarding a second MS, by using a P2P request message received from the first MS and for determining at least one of interference information for each band, channel information, and capability information, each regarding the second MS, by using a P2P grant message received from the second MS;
    an allocator for selecting P2P transmission bands of the first MS and the second MS by using the at least one of the interference information, channel information, and capability information for the first MS and the second MS determined according to the P2P request message and the P2P grant message; and
    a communication unit for transmitting information on the P2P transmission bands of the first MS and the second MS to the first MS and the second MS, respectively.

8. The apparatus of claim 7, wherein the allocator comprises:
    a first calculator for calculating a maximum Transmit (Tx) power level for each band of a transmitting MS by using at least one of a distance between the transmitting MS and the BS for each band, power required for the transmitting MS to receive a preamble from the BS for each band, an estimated value for a channel between the transmitting MS and the BS for each band, a critical Tx power, and a transmission bandwidth of the transmitting MS;
    a second calculator for calculating a preference for each band of the transmitting MS by using information on the maximum Tx power level for each band and by using interference information for each band of a receiving MS; and
    a selector for selecting a P2P transmission band of the transmitting MS according to the preference for each band.

9. The apparatus of claim 8, wherein the first calculator calculates the maximum Tx power level for each band so that a Tx signal of the transmitting MS can be received with a power level below a threshold by the BS which uses the same band as the Tx signal.

10. The apparatus of claim 8, wherein the first calculator calculates the maximum Tx power level for each band so that a Tx signal of the transmitting MS can be received with a power level below a threshold within a cell coverage area in which the same band as the Tx signal is used.

11. The apparatus of claim 8, wherein the preference for each band is one of proportional to the maximum power level of the transmitting MS and inversely proportional to an amount of the interference influencing the receiving MS.

12. A Mobile Station (MS) apparatus in a wireless communication system supporting Peer-to-Peer (P2P) communication, the apparatus comprising:
- a measuring unit for measuring interference information for each band of the MS by using at least one of a downlink signal of a Base Station (BS), an uplink signal of the MS, and a P2P communication signal of a counterpart MS, each of which are received using P2P communication resources, and for measuring channel information of the MS by using a preset signal;
- a processor for determining interference information for each band of the counterpart MS by using a message received from the counterpart MS; and
- an allocator for selecting a P2P transmission band by using the interference information for each band of the counterpart MS, the channel information of the MS, and capability information of the MS.

13. The apparatus of claim 12, wherein the allocator acquires information on a P2P transmission band of the counterpart MS and thereafter selects a P2P transmission band of the MS from the remaining one or more bands other than the P2P transmission band of the counterpart MS.

14. The apparatus of claim 12,
wherein the processor determines channel information of the counterpart MS and capability information of the counterpart MS from a message received from the counterpart MS,
wherein the allocator selects a P2P transmission band of the counterpart MS by using interference information for each band of the MS, channel information of the counterpart MS, and capability information of the counterpart MS; and
further comprises:
a communication unit transmits P2P transmission band information of the counterpart MS to the counterpart MS.

15. The apparatus of claim 12, wherein the allocator comprises:
- a first calculator for calculating a maximum Tx power level for each band by using at least one of a distance between the MS and the BS for each band, power required for the MS to receive a preamble from the BS for each band, an estimated value for a channel between the MS and the BS for each band, a critical Tx power, and a transmission bandwidth;
- a second calculator for calculating a preference for each band by using information on the maximum Tx power level for each band and by using interference information for each band of a receiving MS; and
- a selector for selecting a P2P transmission band of the MS according to the preference for each band.

16. The apparatus of claim 15, wherein the first calculator calculates the maximum Tx power level for each band so that a Tx signal can be received with a power level below a threshold by the BS.

17. The apparatus of claim 15, wherein the first calculator calculates the maximum Tx power level for each band so that a Tx signal can be received with a power level below a threshold within a cell coverage area in which the same band as the Tx signal is used.

18. The apparatus of claim 15, wherein the preference for each band is one of proportional to a maximum power level of a transmitting MS and inversely proportional to an amount of interference influencing the receiving MS.

19. A method of selecting a Peer-to-Peer (P2P) communication band in a wireless communication system supporting P2P communication, the method comprising:

calculating a maximum Transmit (Tx) power level for each band of a Mobile Station (MS) by using channel information and capability information of the MS;
calculating a preference for each band of the MS by using information on the maximum Tx power level for each band and by using interference information for each band of a counterpart MS; and
selecting a P2P transmission band of the MS according to the preference for each band.

20. The method of claim 19, wherein the channel information of the MS comprises at least one of a distance between the MS and a Base Station (BS) for each band, power required for the MS to receive a preamble from the BS for each band, and an estimated value for a channel between the MS and the BS for each band.

21. The method of claim 19, wherein the capability information of the MS comprises at least one of a critical Tx power of the MS and a transmission bandwidth of the MS.

22. The method of claim 19, wherein the maximum Tx power level for each band is calculated so that a Tx signal of the MS can be received with a power level below a threshold by the BS which uses the same band as the Tx signal.

23. The method of claim 19, wherein the maximum Tx power level for each band is calculated so that a Tx signal of the MS can be received with a power level below a threshold within a cell coverage area in which the same band as the Tx signal is used.

24. The method of claim 19, wherein the preference for each band is one of proportional to a maximum power level of a transmitting MS and inversely proportion to an amount of interference influencing the receiving MS.

25. A method of operating a Base Station (BS) in a wireless communication system supporting Peer-to-Peer (P2P) communication, the method comprising:
- determining at least one of interference information for each band, channel information, and capability information, each regarding a first Mobile Station (MS), and identifier information regarding a second MS, by using a P2P request message received from the first MS;
- determining at least one of interference information for each band, channel information, and capability information, each regarding the second MS, by using a P2P grant message received from the second MS;
- selecting P2P transmission bands of the first MS and the second MS by using the at least one of the interference information, channel information, and capability information for the first MS and the second MS determined according to the P2P request message and the P2P grant message; and
- transmitting information on the P2P transmission bands of the first MS and the second MS to the first MS and the second MS, respectively.

26. The method of claim 25, wherein the selecting of the P2P transmission bands comprises:
calculating a maximum Transmit (Tx) power level for each band of a transmitting MS by using at least one of a distance between the transmitting MS and the BS for each band, power required for the transmitting MS to receive a preamble from the BS for each band, an estimated value for a channel between the transmitting MS and the BS for each band, a critical Tx power, and a transmission bandwidth of the transmitting MS;
calculating a preference for each band of the transmitting MS by using information on the maximum Tx power level for each band and by using interference information for each band of a receiving MS; and selecting a P2P transmission band of the transmitting MS according to the preference for each band.

27. The method of claim 26, wherein the maximum Tx power level for each band is calculated so that a Tx signal of the MS can be received with a power level below a threshold by the BS which uses the same band as the Tx signal.

28. The method of claim 26, wherein the maximum Tx power level for each band is calculated so that a Tx signal of the MS can be received with a power level below a threshold within a cell coverage area in which the same band as the Tx signal is used.

29. The method of claim 26, wherein the preference for each band is one of proportional to a maximum power level of the transmitting MS and inversely proportional to an amount of interference influencing the receiving MS.

30. A method of operating a Mobile Station (MS) in a wireless communication system supporting Peer-to-Peer (P2P) communication, the method comprising:
   measuring interference information for each band of the MS by using at least one of a downlink signal of a Base Station (BS), an uplink signal of the MS, and a P2P communication signal of a counterpart MS, each of which are received using P2P communication resources;
   determining interference information for each band of the counterpart MS by using a message received from the counterpart MS; and
   selecting a P2P transmission band by using the interference information for each band of the counterpart MS, channel information of the MS, and capability information of the MS.

31. The method of claim 30, wherein the selecting of the P2P transmission band comprises:
   acquiring information on the P2P transmission band of the counterpart MS; and
   selecting the P2P transmission band of the MS from the remaining one or more bands other than the P2P transmission band of the counterpart MS.

32. The method of claim 30, further comprising:
   determining channel information of the counterpart MS and capability information of the counterpart MS from a message received from the counterpart MS,
   selecting a P2P transmission band of the counterpart MS by using interference information for each band of the MS, channel information of the counterpart MS, and capability information of the counterpart MS; and
   transmitting P2P transmission band information of the counterpart MS to the counterpart MS.

33. The method of claim 30, wherein the selecting of the P2P transmission band comprises:
   calculating a maximum Tx power level for each band by using at least one of a distance between the MS and the BS for each band, power required for the MS to receive a preamble from the BS for each band, an estimated value for a channel between the MS and the BS for each band, a critical Tx power, and a transmission bandwidth;
   calculating a preference for each band by using information on the maximum Tx power level for each band and by using interference information for each band of a receiving MS; and
   selecting a P2P transmission band of the MS according to the preference for each band.

34. The method of claim 33, wherein the maximum Tx power level for each band is calculated so that a Tx signal can be received with a power level below a threshold by the BS.

35. The method of claim 33, wherein the maximum Tx power level for each band is calculated so that a Tx signal can be received with a power level below a threshold within a cell coverage area in which the same band as the Tx signal is used.

36. The method of claim 33, wherein the preference for each band is one of proportional to a maximum power level of a transmitting MS and inversely proportional to an amount of interference influencing the receiving MS.

* * * * *